United States Patent [19]

Aumick

[11] Patent Number: 4,521,949
[45] Date of Patent: Jun. 11, 1985

[54] METHOD OF LOOSENING AND ADJUSTING TIGHTLY-JOINED ELEMENTS

[75] Inventor: James M. Aumick, Addison, N.Y.

[73] Assignee: Ingersoll-Rand Company, Woodcliff Lake, N.J.

[21] Appl. No.: 459,306

[22] Filed: Jan. 20, 1983

[51] Int. Cl.³ ............................................. B23P 11/02
[52] U.S. Cl. ................................ 29/446; 29/156.8 R; 29/426.6; 403/15
[58] Field of Search .................. 29/446, 426.6, 421 R, 29/156.8 R; 403/15, 30

[56] References Cited

U.S. PATENT DOCUMENTS

| | | | |
|---|---|---|---|
| 2,764,437 | 9/1956 | Bratt | 403/15 |
| 2,840,399 | 6/1958 | Harless et al. | 403/15 |
| 3,061,342 | 10/1962 | Feller | 403/15 |
| 3,937,103 | 2/1976 | Kleinhans | 403/15 X |
| 4,375,926 | 3/1983 | Feller | 403/15 |

FOREIGN PATENT DOCUMENTS

| | | | |
|---|---|---|---|
| 969895 | 9/1964 | United Kingdom | 29/446 |
| 740611 | 6/1980 | U.S.S.R. | 29/426.6 |

*Primary Examiner*—Charlie T. Moon
*Attorney, Agent, or Firm*—Bernard J. Murphy

[57] ABSTRACT

The method of the invention defines the steps to be practiced in loosening tightly-joined elements, i.e., loosening a rotor which has been shrunk onto a shaft, for example, in order that the relative positionings of such rotor and shaft may be altered. With the one element having a bore tightly fitted about the surface of the other element, the method teaches the introduction of fluid under pressure between the bore and the surface, whereby the latter is sufficiently expanded to accomplish the loosening. The invention further sets forth tightly-joined elements especially configured to enable a practice of the method. Hence, one of the elements has a conduit formed therein for introducing fluid under pressure to the interface formed by the surfaces of the elements which are in fast engagement.

8 Claims, 3 Drawing Figures

METHOD OF LOOSENING AND ADJUSTING TIGHTLY-JOINED ELEMENTS

This invention pertains to a method of loosening tightly-joined elements, and to such elements having means for releasing the same, and in particular to such method and means using, and responsive to, fluid under pressure.

Machines having interengaging, shaft-borne rotors typically are set for proper or optimum interengagement of the rotors by timing gears, or the like, which are also shaft borne. However, it will occur that, upon such timing gears being mounted on the shafts, correctly set in mesh, and secured in position, the companion rotors will be imprecisely set. Rather than having to unsecure the gears, rotate a shaft to bring the rotors into a precise setting, and correctly setting and securing the gears again, it would be desirable to have a more facile way for correcting the rotors' positionings. Commonly, however, such rotors are shrunk onto their shafts and, therefore, it is necessary to do the correction with the timing gears. What has been needed is a method of loosening tightly-joined elements, such as rotors shrunk onto their shafts; too, there has been a long-felt need for assemblies of tightly-joined elements which are especially designed with releasing means.

It is an object of this invention to set forth just such aforesaid method and elements.

It is particularly an object of this invention to set forth a method of loosening tightly-joined elements, in which a first one of the elements has a bore formed threin which is tightly fitted about a mating surface of a second element, such as a shaft or the like, comprising the step of introducing a fluid under pressure between the bore of the first element and the mating surface of the second element.

It is also an object of this invention to teach tightly-joined elements having releasing means, comprising first and second elements; said first element having a bore formed therein; and said second element having a mating surface which is complementary to said bore; wherein said first element is tightly fitted about said second element, with said bore and said mating surface being in fast engagement; and at least one of said first and second elements has means formed therein for admitting a fluid under pressure between said bore and said mating surface.

Further objects of this invention, as well as the novel features thereof, will become more apparent by reference to the following description, taken in conjunction with the accompanying figures, in which.

Figure 1:
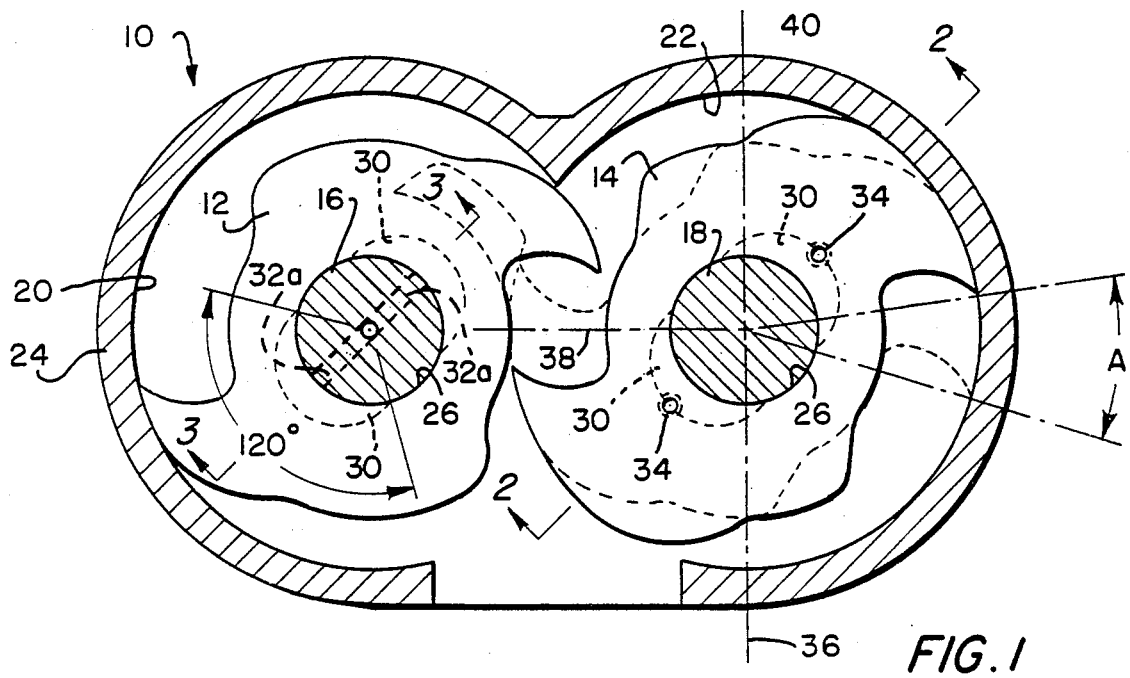
FIG. 1 is an end view, in elevation, of an embodiment of the invention, depicting a pair of coacting, shaft-mounted rotors in a housing, the latter being shown cross-sectioned or cut open to disclose the housing-confined rotors.

As shown in the figures, a machine 10 (here shown, only by way of example, as a rotary air compressor) has a pair of coacting rotors 12 and 14. Rotors 12 and 14 are mounted on parallel shafts 16 and 18 for rotation in intersecting bores 20 and 22 within a housing 24.

Rotor 14 is shown in full-line illustration and in dashed-line, phantomed illustration. The former represents the attitude of the rotor 14 following the assembly of the machine 10, and the latter represents the optimum or correct attitude which the rotor 14 should have. Accordingly, a corrected disposition of rotor 14 would require its clockwise rotation through an arc "A".

Rotor 14, and rotor 12 as well, are shrunk onto their respective shafts 18 and 16. Each has a bore 26 which is tightly fitted about a mating surface 28 of the respective shaft. According to the invention, each rotor 12 or 14 can be loosened from its shaft 16 or 18 by introducing a fluid under pressure between the bore 26 and the mating surface 28. The preferred arrangement in practice of the invention, is shown in FIG. 2, and the right-hand side of FIG. 1, the same comprising rotor 14 and shaft 18.

The bore 26 of rotor 14 has a pair of generally crescent-shaped cavities 30 formed therein on opposite sides of the bore, and conduits 32, which penetrate into the rotor 14, open internally into the cavities 30. The external, exposed ends 34 of the conduits 32 are threaded to accommodate fittings. By attaching fittings into the ends 34, and supplying oil, under a pressure of approximately thirty thousand pounds per square inch, to the conduits 32 and cavities 30, the bore 26 will expand, and the rotor 14 will be hydraulically floated. Then the rotor 14 may be rotated to the dashed-line, phantomed position. Upon the oil pressure being removed, rotor 14 will be seized upon shaft 18 in its correct, adjusted position.

A pair of radial, dashed lines 36 and 38, at approximately ninety degrees of arc from each other, encompass therebetween a quadrant of rotor 14 which has a given mass. A further, radial, dashed line 40, and line 38, encompass therebetween another quadrant of rotor 14 which has a smaller mass. Now, due to the differing masses, the greater-mass quadrant has a cavity 30 substantially confined therewithin. Lesser and diminishing ends of the cavity 30 extend circumferentially beyond the lines 36 and 38 (into smaller-mass quadrants). Each of the cavities 30, then, subsist substantially in the greater-mass quadrants of the rotor 14 where the hydraulic expansion of the bore 26 is most needed and is most resisted.

Figure 2:
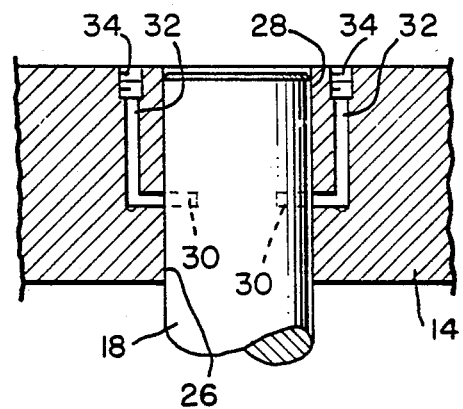
FIG. 2 is a cross-sectional view taken along section 2—2 of FIG. 1.
Figure 3:
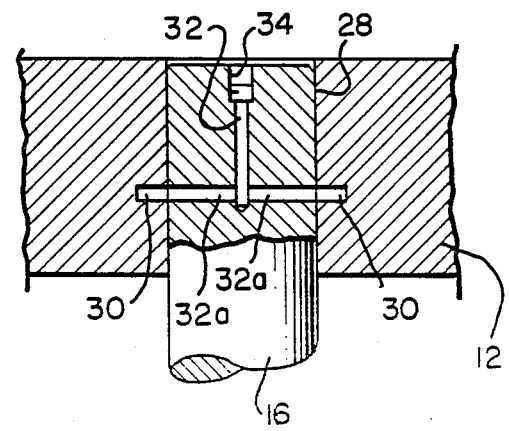
FIG. 3 is a cross-sectional view taken along section 3—3 of FIG. 1.

The alternative arrangement, in practice of the invention, is shown in FIG. 3, and the left-hand side of FIG. 1, the same comprising rotor 12 and shaft 16. In this embodiment a single conduit 32 penetrates the center of the shaft 16 and has oppositely-directed trunks 32a which branch off to reach into the cavities 30. This arrangement lacks the universality of the priorly-described, preferred arrangement. The rotor 12 can be hydraulically "floated", but only through a rotation of not more than approximately one hundred and twenty degrees of arc (as indicated in FIG. 1). Beyond such an arc, the conduit trunks 32a lose communication with the cavities 30.

While I have described my invention in connection with specific embodiments thereof, and specific methods of its practice, it is to be clearly understood that this is done only by way of example and not as a limitation to the scope of my invention as set forth in the objects thereof and in the appended claims.

I claim:

1. A method of loosening and adjusting tightly-joined elements, in which a first one of the elements comprises a rotor which has a bore formed therein which is tightly fitted about a mating surface of a second element, such as a shaft or the like, wherein the rotor has a first quadrant of a given mass, and a second quadrant of a mass which is less than said given mass, comprising the steps of:

introducing a fluid under pressure between the bore of the first element and the mating surface of the second element; wherein said fluid-introducing step comprises introducing a given quantity of fluid under pressure between the bore and the mating surface whereat the latter are radially aligned with said first quadrant, and introducing a quantity of fluid under pressure which is less than said given quantity between the bore and the mating surface whereat the latter are radially aligned with said second quadrant to expand the bore of the rotor relative to the shaft, and adjusting the position of the rotor on the shaft while the bore thereof is expanded relative to the shaft.

2. A method, according to claim 1, wherein:
said fluid-introducing step comprises introducing a pressured hydraulic fluid.

3. A method, according to claim 1, wherein:
said fluid-introducing step comprises introducing a pressured oil.

4. A method, according to claim 1, wherein:
said fluid-introducing step comprises introducing pressured oil through the shaft to the bore.

5. A method, according to claim 1, wherein:
said bore has a circumferential surface which defines an interface with the mating surface of the second element;
at least one of the interfacing surfaces has a cavity formed therein; and
said fluid-introducing step comprises introducing the fluid into the cavity.

6. A method, according to claim 1, wherein:
said fluid-introducing step comprises introducing pressured fluid through the rotor to the bore.

7. A method, according to claim 1, wherein:
said bore has a circumferential surface, and first portions of the latter define contacting interfaces with first portions of the mating surface of the second element;
second portions of the circumferential surface and second portions of the mating surface are in mutually confronting, spaced-apart dispositions, defining cavities therebetween; and
said fluid-introducing step comprises introducing the fluid into the cavities.

8. A method, according to claim 6, wherein:
said bore in said rotor has a circumferential surface;
said circumferential surface has a plurality of spaced-apart cavities formed therein which open onto the mating surface; and
said fluid-introducing step further comprises forming passages in the rotor which communicate with said cavities, and introducing pressured fluid through the passages.

* * * * *